US011967785B2

(12) United States Patent
Ishii et al.

(10) Patent No.: US 11,967,785 B2
(45) Date of Patent: Apr. 23, 2024

(54) HIGH-SPEED TRANSMISSION CONNECTOR

(71) Applicant: Yamaichi Electronics Co., Ltd., Tokyo (JP)

(72) Inventors: Yoshiharu Ishii, Tokyo (JP); Toshiyasu Ito, Tokyo (JP)

(73) Assignee: YAMAICHI ELECTRONICS CO., LTD., Tokyo (JP)

( * ) Notice: Subject to any disclaimer, the term of this patent is extended or adjusted under 35 U.S.C. 154(b) by 184 days.

(21) Appl. No.: 17/570,424

(22) Filed: Jan. 7, 2022

(65) Prior Publication Data

US 2022/0224040 A1 Jul. 14, 2022

(30) Foreign Application Priority Data

Jan. 12, 2021 (CN) ........................ 202110039032.2

(51) Int. Cl.
*H01R 13/502* (2006.01)
*H01R 24/60* (2011.01)
*H01R 107/00* (2006.01)

(52) U.S. Cl.
CPC ........... *H01R 13/502* (2013.01); *H01R 24/60* (2013.01); *H01R 2107/00* (2013.01)

(58) Field of Classification Search
CPC .. H01R 13/502; H01R 24/60; H01R 2107/00; H01R 13/46; H01R 13/40
USPC ........................................................... 439/39
See application file for complete search history.

(56) References Cited

U.S. PATENT DOCUMENTS

| | | | | |
|---|---|---|---|---|
| 9,331,434 | B2 * | 5/2016 | Zhu | H01R 13/6585 |
| 9,722,342 | B2 * | 8/2017 | Yuan | H01R 13/428 |
| 2015/0017838 | A1 * | 1/2015 | Zhu | H01R 13/6585 439/625 |
| 2017/0085021 | A1 * | 3/2017 | Tsai | H01R 4/02 |
| 2018/0151988 | A1 * | 5/2018 | Zhao | H01R 13/506 |
| 2018/0183186 | A1 * | 6/2018 | Yu | H01R 13/40 |
| 2018/0212338 | A1 * | 7/2018 | Chang | H01R 13/6583 |
| 2019/0131743 | A1 * | 5/2019 | Hsu | H01R 13/405 |
| 2019/0165518 | A1 * | 5/2019 | Hsu | H01R 13/6471 |
| 2019/0173237 | A1 * | 6/2019 | Oosaka | H01R 13/26 |
| 2020/0112129 | A1 * | 4/2020 | Liu | H01R 13/502 |
| 2020/0335914 | A1 * | 10/2020 | Hsu | H01R 12/716 |
| 2021/0320448 | A1 * | 10/2021 | Chung | H01R 13/6471 |

* cited by examiner

*Primary Examiner* — Alexander Gilman
(74) *Attorney, Agent, or Firm* — Hayes Soloway PC

(57) ABSTRACT

A high-speed transmission connector is described that includes a housing, a row of front side contacts supported on the housing, a row of rear side contacts supported on the housing, and a metal member. The housing has a slot to be fitted with a header of an external communication partner, and an upper plate portion and a lower plate portion facing each other vertically across the slot. The front side contact portions are exposed on a front side in the slot and the rear side contact portions are exposed on a rear side in the slot. The metal member supports the upper plate portion and the lower plate portion and fastens the upper plate portion and the lower plate portion.

9 Claims, 15 Drawing Sheets

HIGH-SPEED TRANSMISSION CONNECTOR

CROSS-REFERENCE TO RELATED APPLICATION

This application claims priority to Chinese patent application CN202110039032.2, filed on Jan. 12, 2021, the contents of which are incorporated herein by reference.

TECHNICAL FIELD

The present disclosure relates to a connector for high-speed transmission mounted on a circuit board.

BACKGROUND

Among high-speed transmission connectors, there are a normal single type and a DD (Double Density) type that can perform signal transmission with a larger channel number. DD type connector has a total of four rows of contacts, two rows up and down on the front side and two rows up and down on the rear side, in the slot to accommodate the header of the module of a communication partner. The DD type connector can perform high-speed signal transmission of up to eight channels through these four rows of contacts. As a document disclosing a technique related to this type of connector, U.S. Patent 2019-0131743A1 (hereinafter referred to as "Patent Document 1") can be given. The electrical connector disclosed in Patent Document 1 is formed in such a configuration in which a laminated body of an upper side contact module and a lower side contact module is arranged between the bottom wall portion and the upper wall that face each other across a fitting slot in the housing. The upper side contact module includes the first contact and the second contact and the lower side contact module includes the third contact and the fourth contact. Contact portions, which are the front ends of the first contact and the second contact, face each other vertically on the front side in the fitting slot, further contact portions, which are the front ends of the third contact and the fourth contact, face each other on the rear side in the fitting slot, and attachment portions, which are the rear ends of the first to fourth contacts, are exposed downward from the opening under the bottom wall portion.

However, with the miniaturization and densification of the connector, it has become difficult to make the upper and lower plates of the slot in the housing thick enough to ensure sufficient strength. In particular, since in the DD type connector, the header of the module is inserted between the upper and lower plates, it is not possible to provide a member for connecting the plates between the partition walls that support the contacts in the upper and lower plates, and it is not possible to provide connection only in the pitch direction of the contacts. Therefore, it is more difficult to ensure strength in the DD type connector. Further, when heat is applied to the DD type connector with the module remained to be fitted, it is so difficult to secure the strength only by the housing that the housing bulges, the contact force is lost, and the contact becomes unstable.

The present disclosure has been made in view of such a problem, and one of the objects is to improve the strength of the housing of the high-speed transmission connector.

SUMMARY

In accordance with a first aspect of the present disclosure, there is provided a high-speed transmission connector including: a housing having a slot to be fitted with a header of an external communication partner, and an upper plate portion and a lower plate portion facing each other vertically across the slot; a row of front side contacts supported on the housing in such a manner that contact portions are exposed on a front side in the slot; a row of rear side contacts supported on the housing in such a manner that contact portions are exposed on a rear side in the slot; and a metal member to support the upper plate portion and the lower plate portion and fasten the upper plate portion and the lower plate portion.

DETAILED DESCRIPTION

First Embodiment

Hereinafter, a high-speed transmission connector 8, which is an embodiment of the present disclosure, is explained with reference to drawings. The high-speed transmission connector 8 is used by being mounted on a circuit board. Into the slot 6 of the high-speed transmission connector 8, the header 90 of the optical transceiver 9 as a communication partner device is fitted.

In the following description, the mounting direction of the high-speed transmission connector 8 with respect to the circuit board is appropriately referred to as a Z direction, the fitting direction of the high-speed transmission connector 8 and the optical transceiver 9 is appropriately referred to as a Y direction, and the direction orthogonal to the Z direction and the X direction is appropriately referred to as a Y direction. In addition, the +Z side which is the side of the high-speed transmission connector 8 in the Z direction is appropriately referred to as an upper side, and the −Z side which is the side of the circuit board is appropriately referred to as a lower side. In addition, the −Y side which is the side of the optical transceiver 9 in the Y direction is appropriately referred to as a front side, and the +Y side which is the side of the high-speed transmission connector 8 is appropriately referred to as a rear side. In addition, the +X side is appropriately referred to as a left side, and the −X side is appropriately referred to as a right side.

Figure 1A:
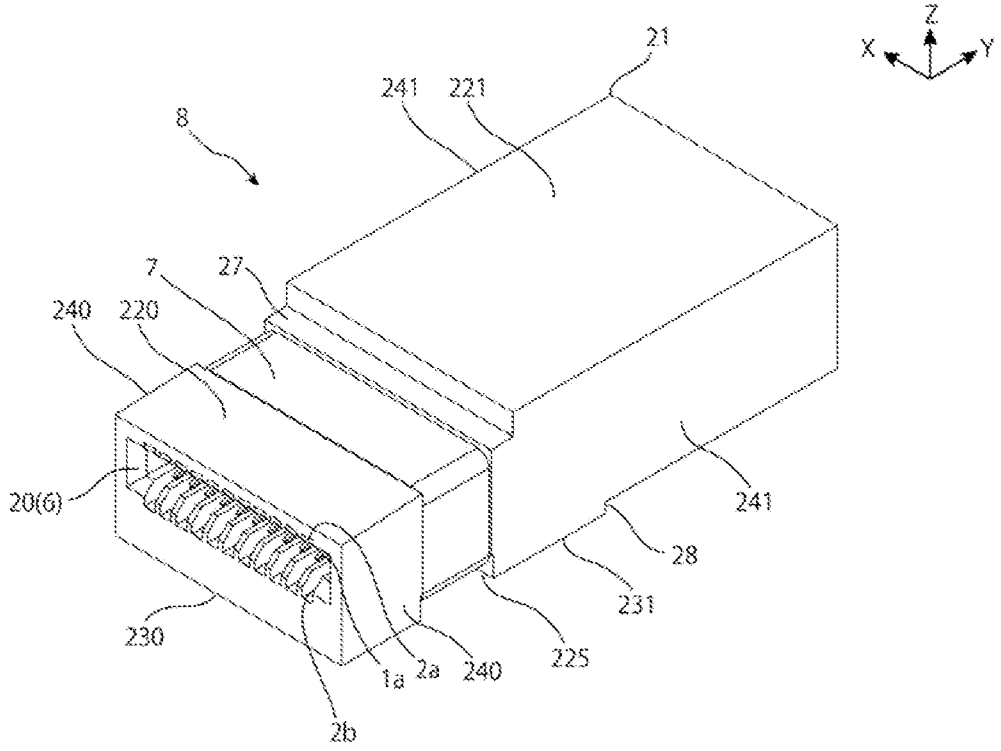
FIG. 1A is a perspective view of a high-speed transmission connector according to a first embodiment of the present disclosure.
Figure 1B:
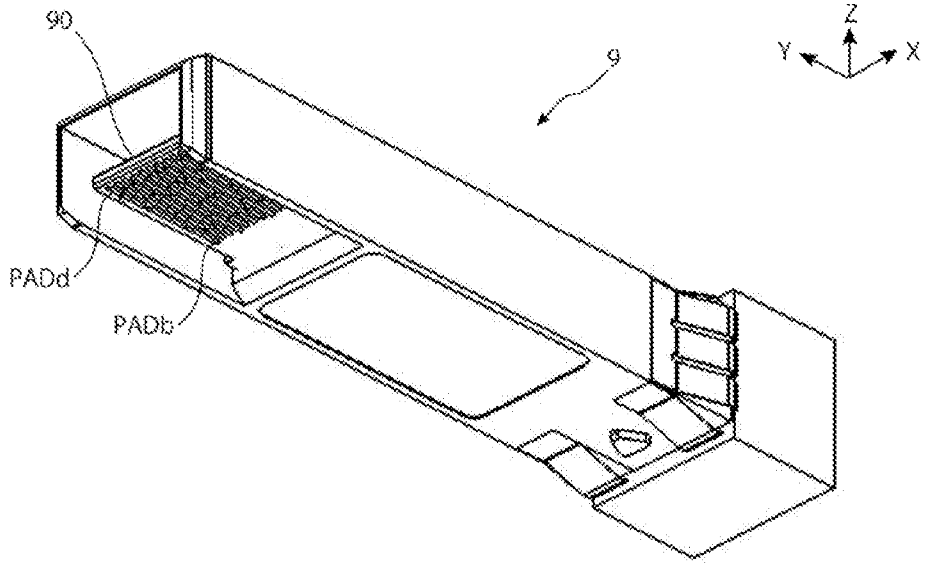
FIG. 1B is a perspective view of an optical transceiver to be fitted into the high-speed transmission connector of FIG. 1A.

As shown in FIG. 1B, the optical transceiver 9 has a stick shape. A header 90 projects from the end portion on the front side of the optical transceiver 9. There is a row of first pads PADa on the −Y side of the upper surface of the header 90, and there is a row of second pads PADb on the −Y side of the lower surface. There is a row of third pads PADc on the +Y side of the upper surface of the header 90, and there is a row of fourth pads PADd on the +Y side of the lower surface.

The high-speed transmission connector 8 has an outer housing 21, an inner housing 31, eleven first contacts 1*a*, eleven second contacts 1*b*, eleven third contacts 1*c*, eleven fourth contacts 1*d*, and a metal member 7.

The outer housing 21 has a box shape with an opening portion 20 and a cavity portion 23 on the rear side of the opening portion. The outer housing 21 includes: a front side upper plate portion 220 and a front side lower plate portion 230 facing each other vertically across the opening portion 20; left and right side plate portions 240 interposed between the front side upper plate portion 220 and the front side lower plate portion 230; a rear side upper plate portion 221 and a rear side lower plate portion 231 facing each other vertically across the cavity portion 23; and left and right side plate portions 241 interposed between the rear side upper plate portion 221 and the rear side lower plate portion 231.

A portion of the front side of the rear side upper plate portion 221 is cut out to the lower side to form a stepped portion 27. A portion of the rear side of the rear side lower plate portion 231 is cut out to the upper side to form a stepped portion 28. A portion of the rear side of the stepped portion 28 is opened to the lower side as an open portion 29.

Figure 3A:
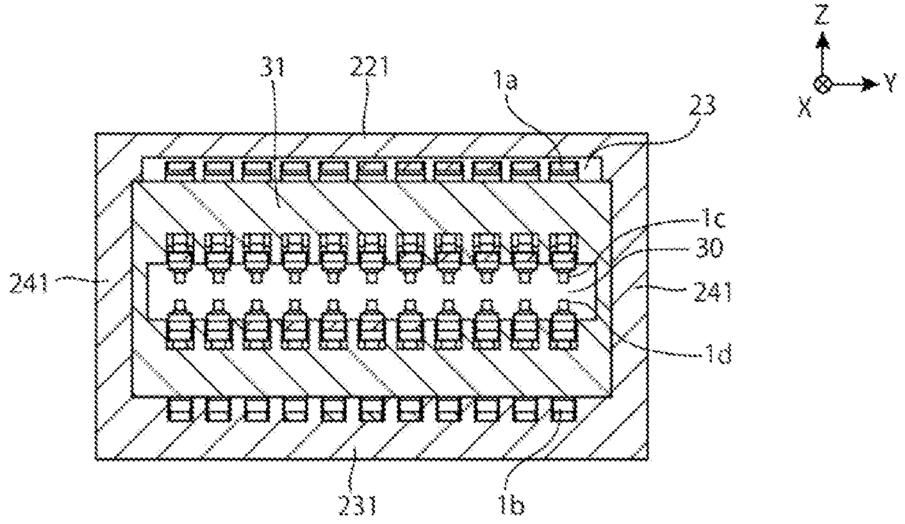
FIG. 3A is a sectional view taken along line Q-Q of FIG. 2C.
Figure 3B:
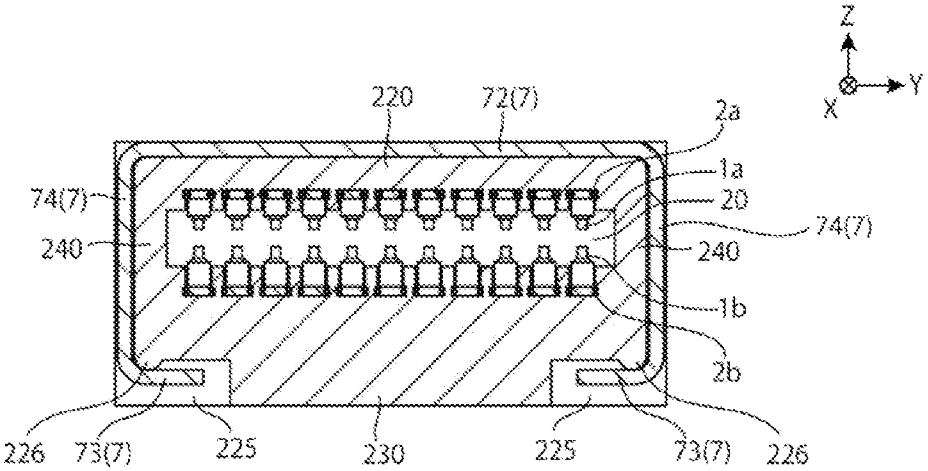
FIG. 3B is a sectional view taken along line J-J of FIG. 2C.

A recess 225 is provided on the outer periphery of the outer housing 21. The recess 225 is formed by recessing a portion of the outer housing 21 from the upper surface to the lower surface via the side surface. As shown in FIG. 3B, a convex portion 226 projecting downward is provided at a portion of the recess 225 going around from the side surface side of the outer housing 21 to the lower surface side. Further, the depths of the recess 225 at the front side upper plate portion 220 and the side plate portion 240 are almost the same, and the depth of the recess 225 at the front side lower plate portion 230 is deeper than the depths of the recess 225 at the front side upper plate portion 220 and the side plate portion 240.

As shown in FIG. 3B, a row of grooves 2*a* and a row of grooves 2*b* are provided on a surface of the front side upper plate portion 220 facing the opening portion 20 and a surface of the front side lower plate portion 230 facing the opening portion 20. The row of grooves 2*a* and the row of grooves 2*b* are arranged side by side in the left-right direction, respectively. The grooves 2*a* and the grooves 2*b* extend in the front-rear direction, respectively.

Figure 3C:
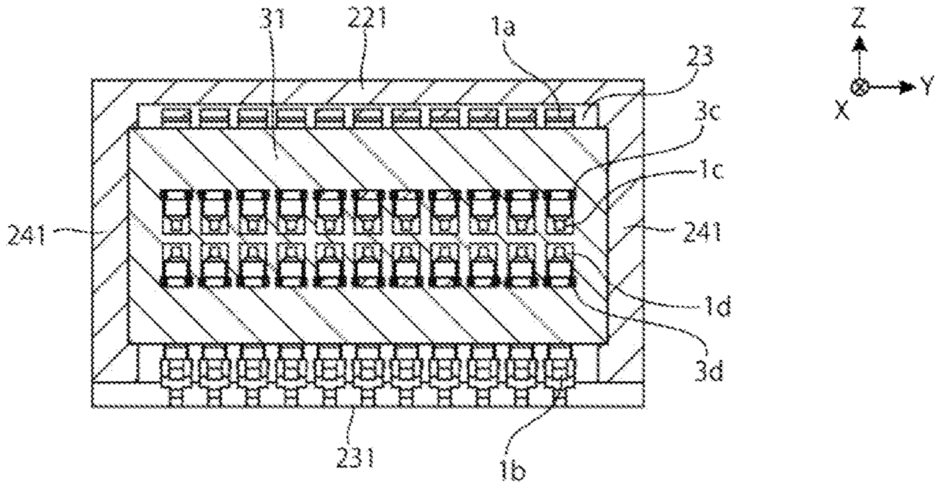
FIG. 3C is a sectional view taken along line K-K of FIG. 2C.

The inner housing 31 is formed in a box shape with an opening portion 30. As shown in FIG. 3C, a row of holes 3*c* and a row of holes 3*d* are provided at a portion of the inner housing 31 on the rear side of the opening portion 30. The row of holes 3*c* and the row of holes 3*d* are arranged separately up and down and arranged side by side in the left-right direction, respectively. The holes 3*c* and holes 3*d* extend in the front-rear direction, respectively.

The inner housing 31 is accommodated and fixed in the cavity portion 23 of the outer housing 21. As shown in FIG. 2D and FIG. 2E, the opening portion 20 of outer housing 21 and the opening portion 30 of the inner housing 31 communicate with each other. The slot 6 is formed by the opening portion 20 and the opening portion 30.

Figure 2A:
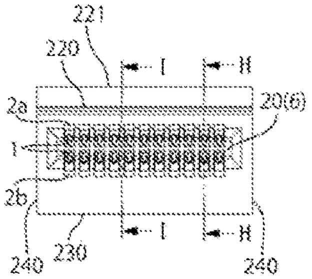
FIG. 2A is a diagram of FIG. 1A as viewed from a −Y side.
Figure 2B:
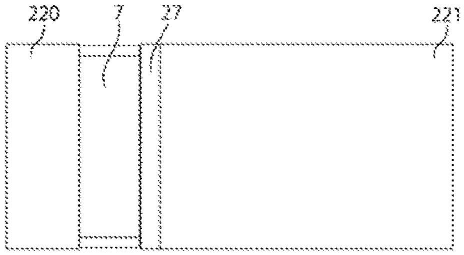
FIG. 2B is a diagram of FIG. 1A as viewed from a +Z side.
Figure 2C:
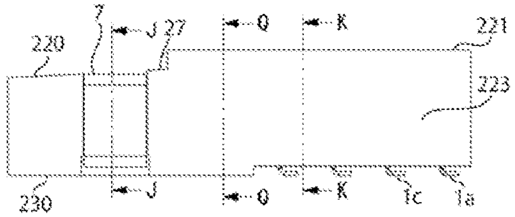
FIG. 2C is a diagram of FIG. 1A as viewed from a −X side.
Figure 2D:
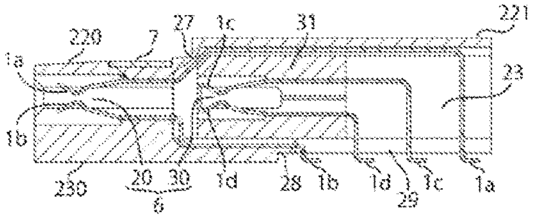
FIG. 2D is a sectional view taken along line H-H of FIG. 2A.
Figure 2E:
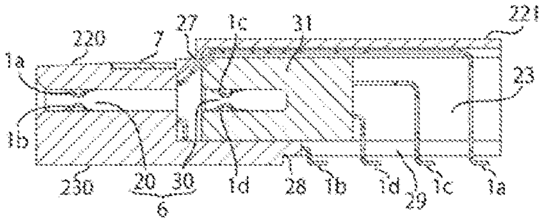
FIG. 2E is a sectional view taken along line I-I of FIG. 2A.
Figure 2F:
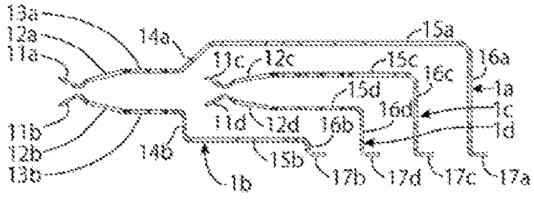
FIG. 2F is a diagram of contacts 1*a*, 1*b*, 1*c*, and 1*d* as viewed from the −X side.

As shown in FIG. 2F, the front-rear dimensions of the first contact 1*a*, the second contact 1*b*, the third contact 1*c*, and the fourth contact 1*d* become smaller in the order of the first contact 1*a*>the second contact 1*b*>the third contact 1*c*>the fourth contact 1*d*.

The first contact 1*a* has: a tip end side contact portion 11*a* bent in a V shape; a linear portion 12*a* extending obliquely upward and rearward from the rear end of the tip end side contact portion 11*a*; a linear portion 13*a* extending rearward from the rear end of the linear portion 12*a*; a linear portion 14*a* extending obliquely upward and rearward from the rear end of the linear portion 13*a*; a linear portion 15*a* extending rearward from the rear end of the linear portion 14*a*; a linear portion 16*a* extending downward from the rear end of the linear portion 15*a*; and a substrate side contact portion 17*a* extending rearward from the lower end of the linear portion 16*a*.

The second contact 1*b* has: a tip end side contact portion 11*b* bent in a V shape; a linear portion 12*b* extending obliquely downward and rearward from the rear end of the tip end side contact portion 11*b*; a linear portion 13*b* extending rearward from the rear end of the linear portion 12*b*; a linear portion 14*b* extending downward from the rear end of the linear portion 13*b*; a linear portion 15*b* extending rearward from the rear end of the linear portion 14*b*; a linear portion 16*b* extending downward from the rear end of the linear portion 15*b*; and a substrate side contact portion 17*b* extending rearward from the lower end of the linear portion 16*b*.

The third contact 1*c* has: a tip end side contact portion 11*c* bent in a V shape; a linear portion 12*c* extending obliquely upward and rearward from the rear end of the tip end side contact portion 11*c*; a linear portion 15*c* extending rearward from the rear end of the linear portion 12*c*; a linear portion 16*c* extending downward from the rear end of the linear portion 15*c*; and a substrate side contact portion 17*c* extending rearward from the lower end of the linear portion 16*c*.

The fourth contact 1*d* has: a tip end side contact portion 11*d* bent in a V shape; a linear portion 12*d* extending obliquely downward and rearward from the rear end of the tip end side contact portion 11*d*; a linear portion 15*d* extending rearward from the rear end of the linear portion 12*d*; a linear portion 16*d* extending downward from the rear end of the linear portion 15*d*; and a substrate side contact portion 17*d* extending rearward from the lower end of the linear portion 16*d*.

The first contact 1*a* and the second contact 1*b* are supported by the outer housing 21 so that the tip end side contact portions 11*a* and 11*b* are exposed on the front side of the slot 6. The linear portion 13*a* of the first contact 1*a* is pressed into the groove 2*a*, and the linear portion 13*b* of the second contact 1*b* is pressed into the groove 2*b*.

The third contact 1*c* and the fourth contact 1*d* are supported by the inner housing 31 so that the tip end side contact portions 11*c* and 11*d* are exposed on the rear side of the slot 6. The linear portion 15*c* of the third contact 1*c* is inserted into the hole 3*c*, and the linear portion 15*d* of the fourth contact 1*d* is inserted into the hole 3*d*.

The substrate side contact portion 17*a* of the first contact 1*a*, the substrate side contact portion 17*b* of the second contact 1*b*, the substrate side contact portion 17*c* of the third contact 1*c*, and the substrate side contact portion 17*d* of the fourth contact 1*d* are exposed on the lower side of the open portion 29. The substrate side contact portion 17*a*, the substrate side contact portion 17*b*, the substrate side contact portion 17*c*, and the substrate side contact portion 17*d* are separated front and rear at the same intervals.

When the high-speed transmission connector 8 is mounted on the electronic substrate, the substrate side contact portion 17*a*, the substrate side contact portion 17*b*, the substrate side contact portion 17*c*, and the substrate side contact portion 17*d* are in contact with the pads of the electronic substrate. When the header 90 of the optical transceiver 9 is fitted into the slot 6 of the high-speed transmission connector 8, the tip end side contact portions 11*a*, 11*b*, 11*c*, 11*d* of the high-speed transmission connector 8 are in contact with the pads PADa, PADb, PADc, PADd of the optical transceiver 9.

Figure 4:
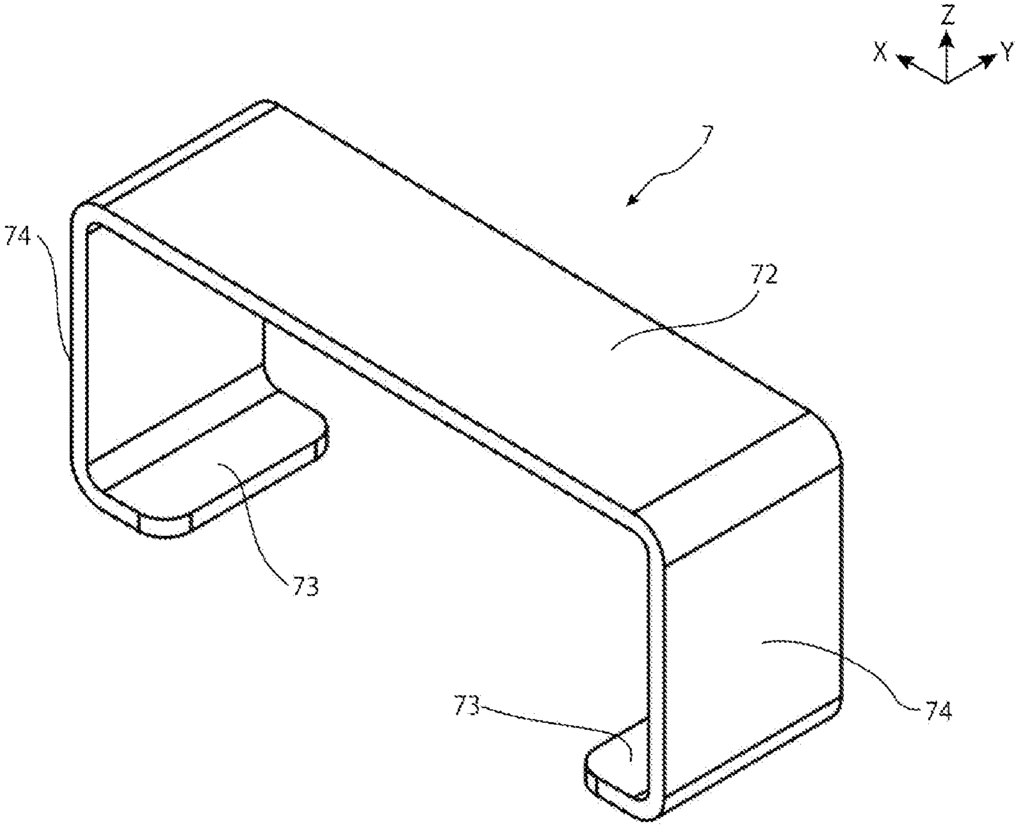
FIG. 4 is a perspective view of a metal member 7 of FIG. 1A.
Figure 5A:
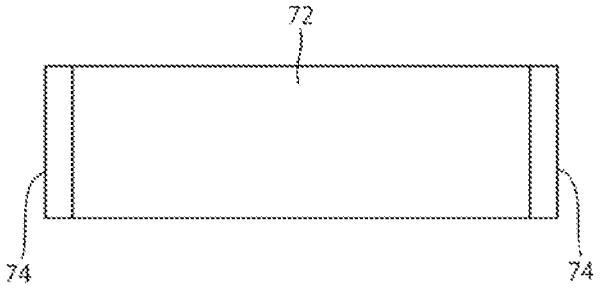
FIG. 5A is a diagram of FIG. 4 as viewed from the +Z.
Figure 5B:
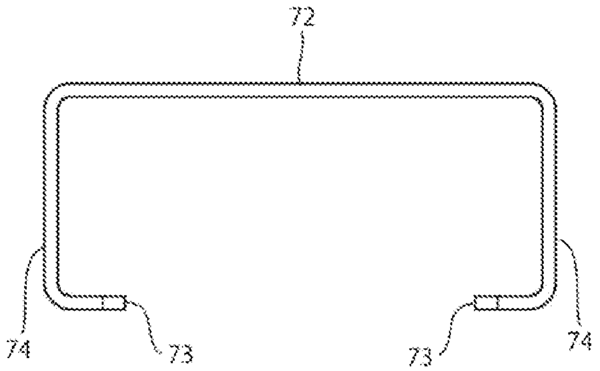
FIG. 5B is a diagram of FIG. 4 as viewed from the −Y side.
Figure 5C:
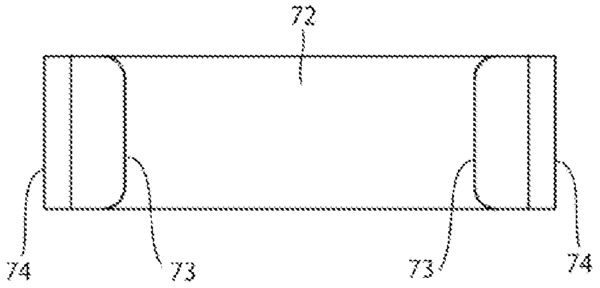
FIG. 5C is a diagram of FIG. 4 as viewed from the −Z side.
Figure 5D:
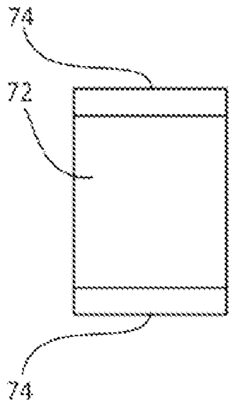
FIG. 5D is a diagram of FIG. 4 as viewed from the −X side.
Figure 6:
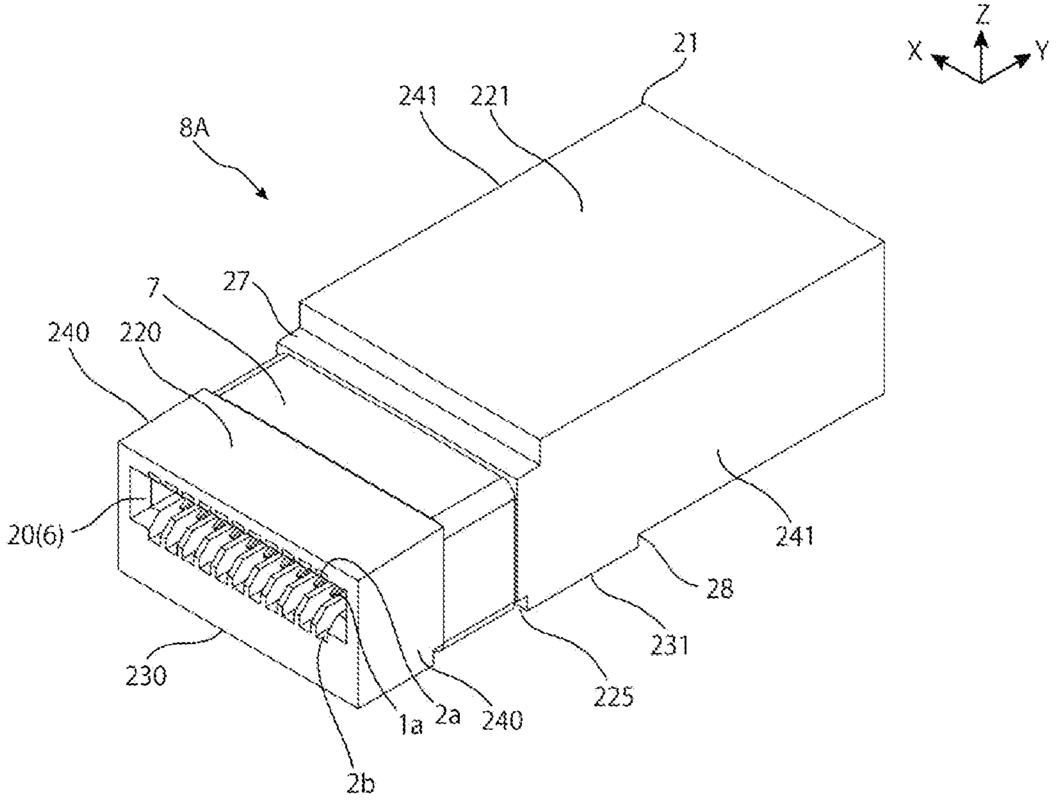
FIG. 6 is a perspective view of a high-speed transmission connector 8A according to a second embodiment of the present disclosure.

As shown in FIG. 4, the metal member 7 is a member formed by bending one rectangular metal plate at four ridgelines. The metal member 7 has a horizontal plate portion 72 extending in the X direction, vertical plate portions 74 bending and extending downward from both ends of the horizontal plate portion 72, and return portions 73 that bend from lower ends of the vertical plate portions 74 to the inside and extend.

As shown in FIG. 1 A, FIG. 2B, FIG. 2C, and FIG. 3B, the metal member 7 is fitted in the recess 225 of the outer housing 21. The metal member 7 supports the front side upper plate portion 220 and the front side lower plate portion 230 of the outer housing 21 and fastens the front side upper plate portion 220 and the front side lower plate portion 230. The boundary portion between the horizontal plate portion 72 and the return portion 73 of the metal member 7 abuts the convex portion 226. The return portion 73 of the metal member 7 goes around to the inside of the convex portion 226 and supports the convex portion 226 from the lower side. Between the return portion 73 and the circuit board on which the high-speed transmission connector 8 is mounted, a gap having approximately the same thickness as the metal member 7 is formed. In this embodiment, the return portion 73 corresponds to, e.g., a first return portion defined in the claims.

The above is the details of the present embodiment. The high-speed transmission connector 8 of the present embodiment includes: an outer housing 21 that has a slot 6 into which the header 90 of the optical transceiver 9 is fitted, and a front side upper plate portion 220 and a front side lower plate portion 230 facing each other vertically across the slot 6; an inner housing 31; a row of first contacts 1*a* and a row of second contacts 1*b* on the front side supported by the outer housing 21 so as to expose the tip end side contact portions 11*a*, 11*b* on the front side in the slot 6; a row of third contacts 1*c* and a row of fourth contacts 1*d* on the rear side supported by the inner housing 31 so as to expose the tip end side contact portions 11*c*, 11*d* on the rear side in the slot 6; and a metal member 7 supporting the front side upper plate portion 220 and the front side lower plate portion 230 and fastening the front side upper plate portion 220 and the front side lower plate portion 230. Thus, when the header 90 of the optical transceiver 9 is inserted into the slot 6, the force of pressing and expanding the front side upper plate portion 220 and the front side lower plate portion 230 can be suppressed by the metal member 7. Therefore, the strength of a housing can be reinforced, and the loss of contact force and the instability of contact can be prevented.

Second Embodiment

Figure 7A:
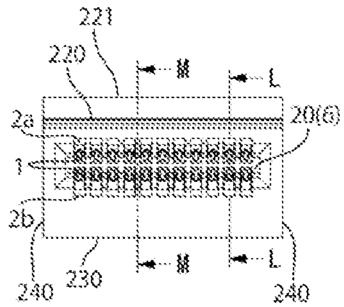
FIG. 7A is a diagram of FIG. 6 as viewed from the −Y side.
Figure 7B:
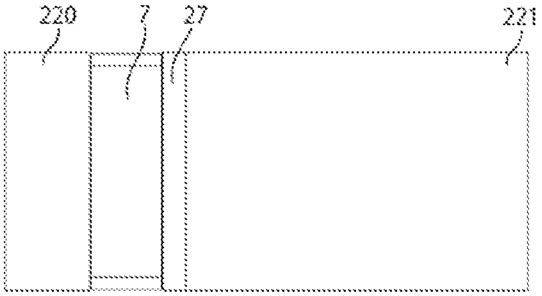
FIG. 7B is a diagram of FIG. 6 as viewed from the +Z side.
Figure 7C:
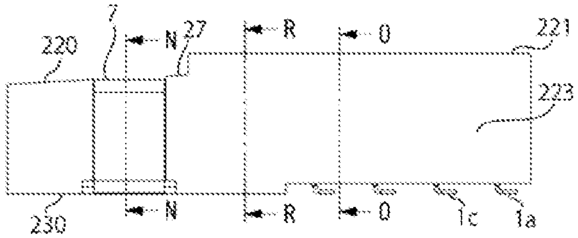
FIG. 7C is a diagram of FIG. 6 as viewed from the −X side.
Figure 7D:
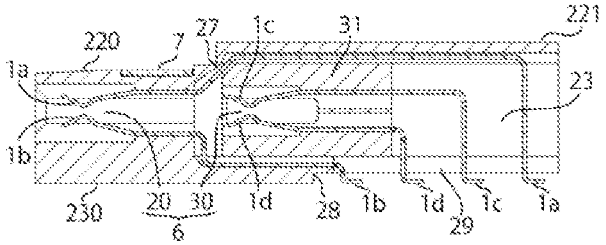
FIG. 7D is a sectional view taken along line L-L of FIG. 7A.
Figure 7E:
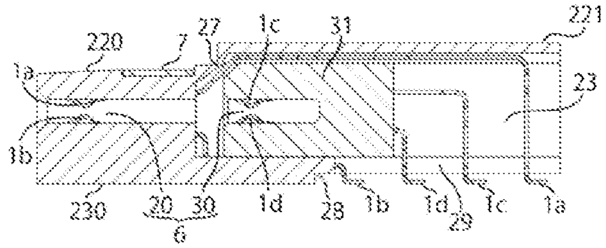
FIG. 7E is a sectional view taken along line M-M of FIG. 7A.
Figure 8A:
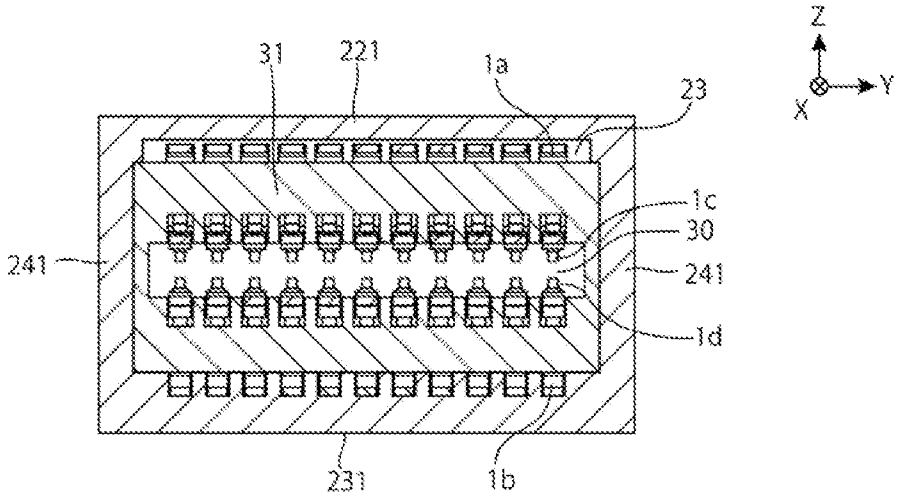
FIG. 8A is a sectional view taken along line R-R of FIG. 7C.
Figure 8B:
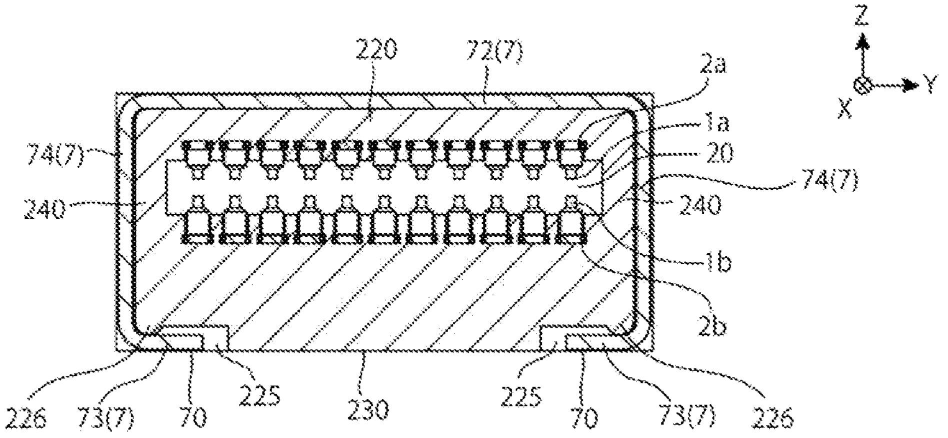
FIG. 8B is a sectional view taken along line N-N of FIG. 7C.
Figure 8C:
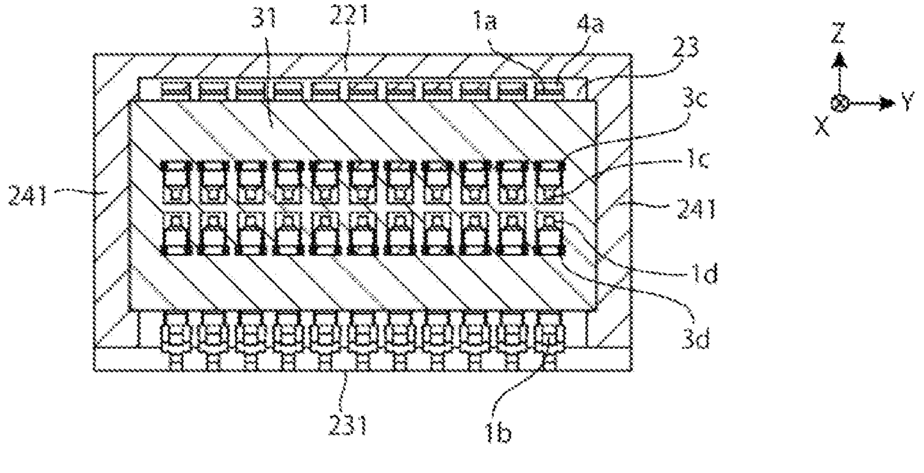
FIG. 8C is a sectional view taken along line O-O of FIG. 7C.

Next, the second embodiment of the present disclosure is described. In the above first embodiment, the depths of the recess 225 on the upper surface and the side surface of the outer housing 21 are approximately the same, and the depth of the recess 225 on the lower surface is deeper than the depths of the recess 225 on the upper surface and the side surface. In contrast, as shown in FIG. 7B and FIG. 7C, in the high-speed transmission connector 8A of the present embodiment, the depths of the recess 225 on the upper surface, the side surface, and the lower surface of the outer housing 21 are approximately the same. As shown in FIG. 8C, in a state where the metal member 7 is fitted into the recess 225, the lower surfaces of the return portions 73 of the metal member 7 form the joining portions 70 soldered to the circuit board. According to the present embodiment, the joining strength between the high-speed transmission connector 8A and the circuit board can be further improved by the metal member 7.

Third Embodiment

Figure 9:
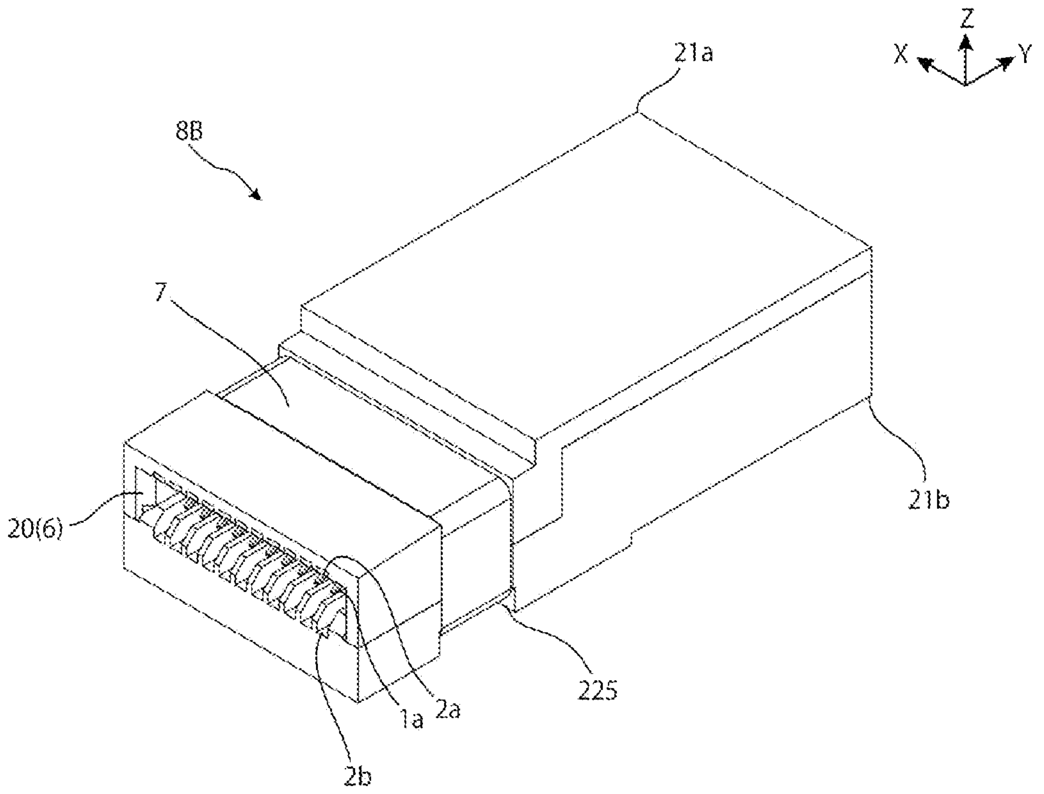
FIG. 9 is a perspective view of a high-speed transmission connector according to a third embodiment of the present disclosure.
Figure 10A:
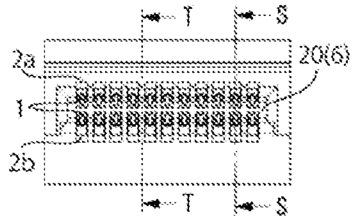
FIG. 10A is a diagram of FIG. 9 as viewed from the −Y side.
Figure 10B:
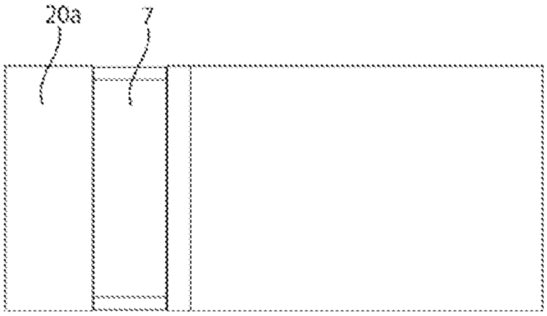
FIG. 10B is a diagram of FIG. 9 as viewed from the +Z side.
Figure 10C:
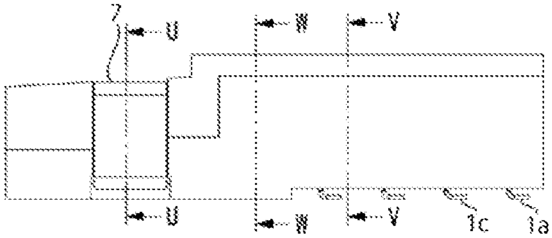
FIG. 10C is a diagram of FIG. 9 as viewed from the −X side.
Figure 10D:
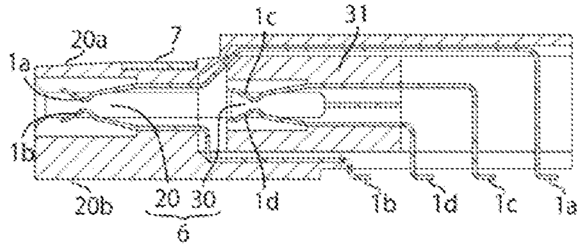
FIG. 10D is a sectional view taken along line S-S of FIG. 10A.
Figure 10E:
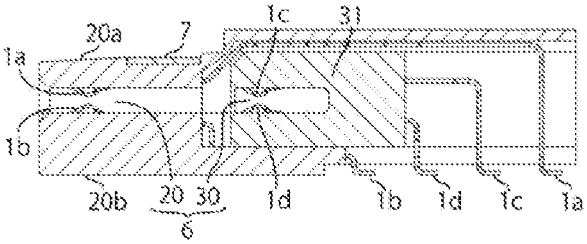
FIG. 10E is a sectional view taken along line T-T of FIG. 10A.
Figure 11A:
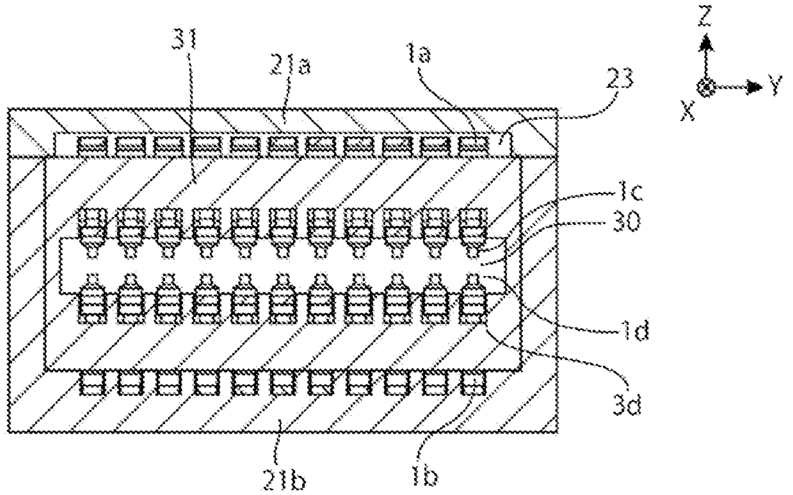
FIG. 11A is a sectional view taken along line W-W of FIG. 10C.
Figure 11B:
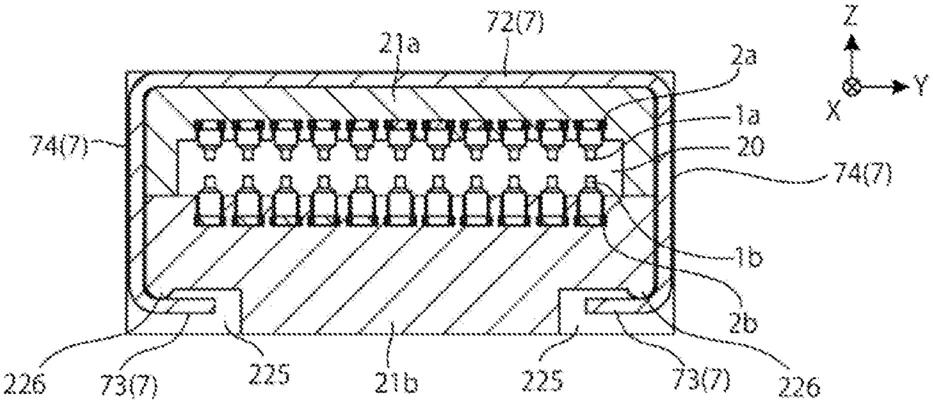
FIG. 11B is a sectional view taken along line U-U of FIG. 10C.
Figure 11C:
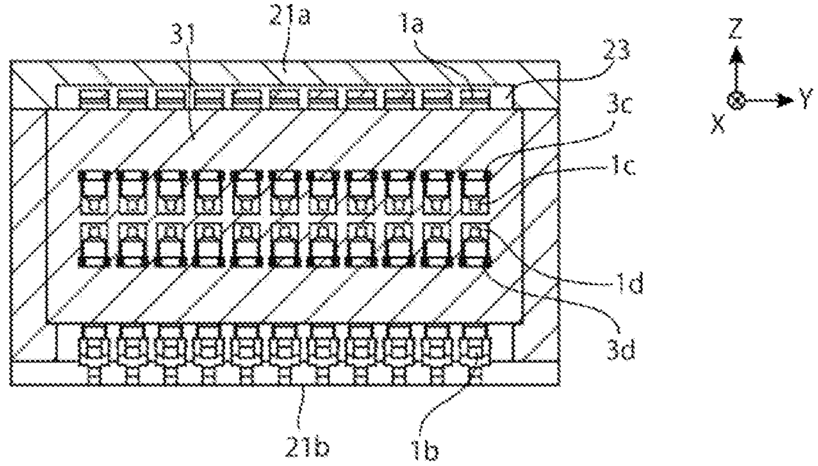
FIG. 11C is a sectional view taken along line V-V of FIG. 10C.
Figure 12:
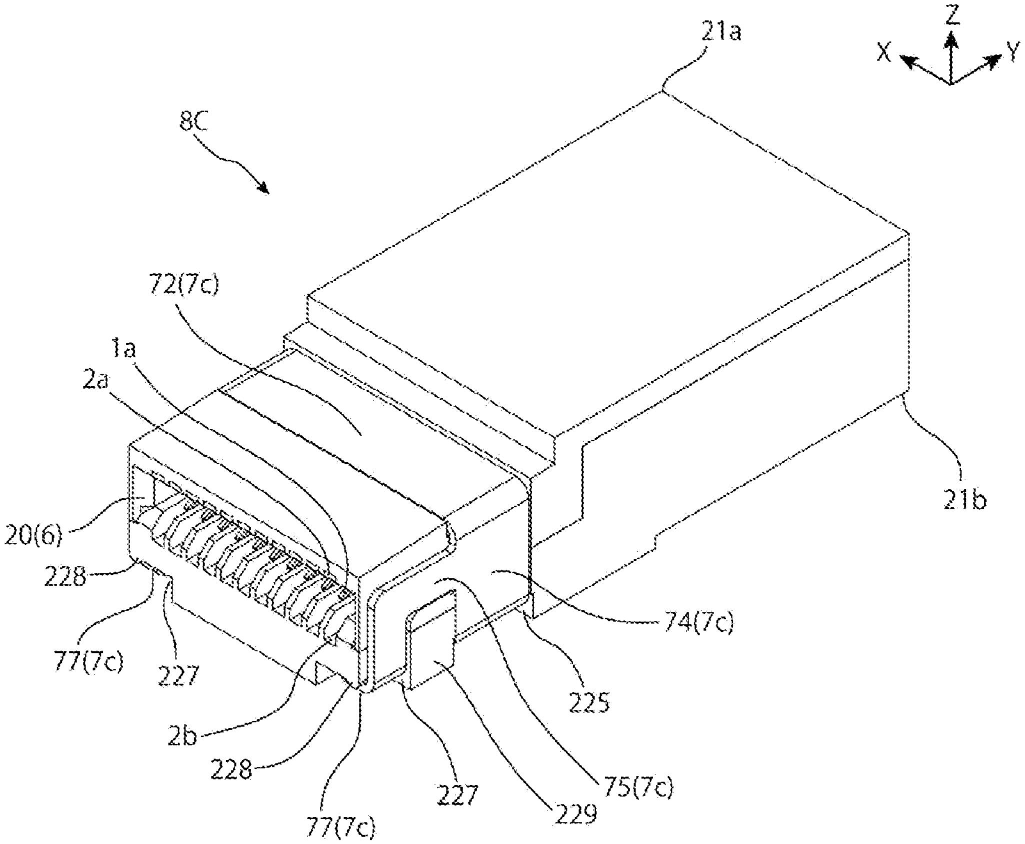
FIG. 12 is a perspective view of a high-speed transmission connector according to a fourth embodiment of the present disclosure.

Next, the third embodiment of the present disclosure is described. In the above first embodiment, the housing of the high-speed transmission connector 8 is formed by the outer housing 21 and the inner housing 31. In contrast, as shown in FIG. 9, in the high-speed transmission connector 8B of the present embodiment, the outer housing 21 is divided into an upper housing 21*a* and a lower housing 21*b*, and a recess 225 into which the metal member 7 is fitted is formed at portions of the upper housing 21*a* and the lower housing 21*b* surrounding the slot 6. The recess 225 is formed by recessing a portion extending from the upper surface of the upper housing 21*a* to the side surface of the upper housing 21*a*, the side surface of the lower housing 21*b*, and the lower surface of the lower housing 21*b*. The upper housing 21*a*, the lower housing 21*b*, and the inner housing 31 are combined so that the upper housing 21*a* and the lower housing 21*b* are aligned up and down, and the inner housing 31 is accommodated in the upper housing 21*a* and the lower housing 21*b*.

Here, since the header 90 of the optical transceiver 9 to be inserted into the slot 6 of the high-speed transmission connector 8B reaches the opening portion 30 of the inner housing 31, the portions of the inner housing 31 above and below the opening portion 30 may bulge outward to press the upper housing 21*a* and the lower housing 21*b*. In the present embodiment, the metal member 7 serves to reinforce the connection between the upper housing 21*a* and the lower housing 21*b*, and the upper housing 21*a* and the lower housing 21*b* are difficult to separate.

Fourth Embodiment

Next, the fourth embodiment of the present disclosure is described. In the above first embodiment, the metal member 7 is a member formed by bending one rectangular metal plate. In contrast, as shown in FIG. 12, FIG. 13, FIG. 14, FIG. 15A, FIG. 15B, FIG. 15C, and FIG. 15D, the second metal member 7C of the high-speed transmission connector 8C of the present embodiment has: a horizontal plate portion 72 extending in the X direction; vertical plate portions 74 bending and extending downward from both ends of the horizontal plate portion 72; return portions 73 bending and extending inward from the lower ends of the vertical plate portions 74; projecting portions 75 projecting forward from the end sides of the vertical plate portions 74 on the front side; second vertical plate portions 76 extending downward from the front ends of the projecting portions 75; and second return portions 77 bending and extending inward from the lower ends of the second vertical plate portions 76.

Figure 13:
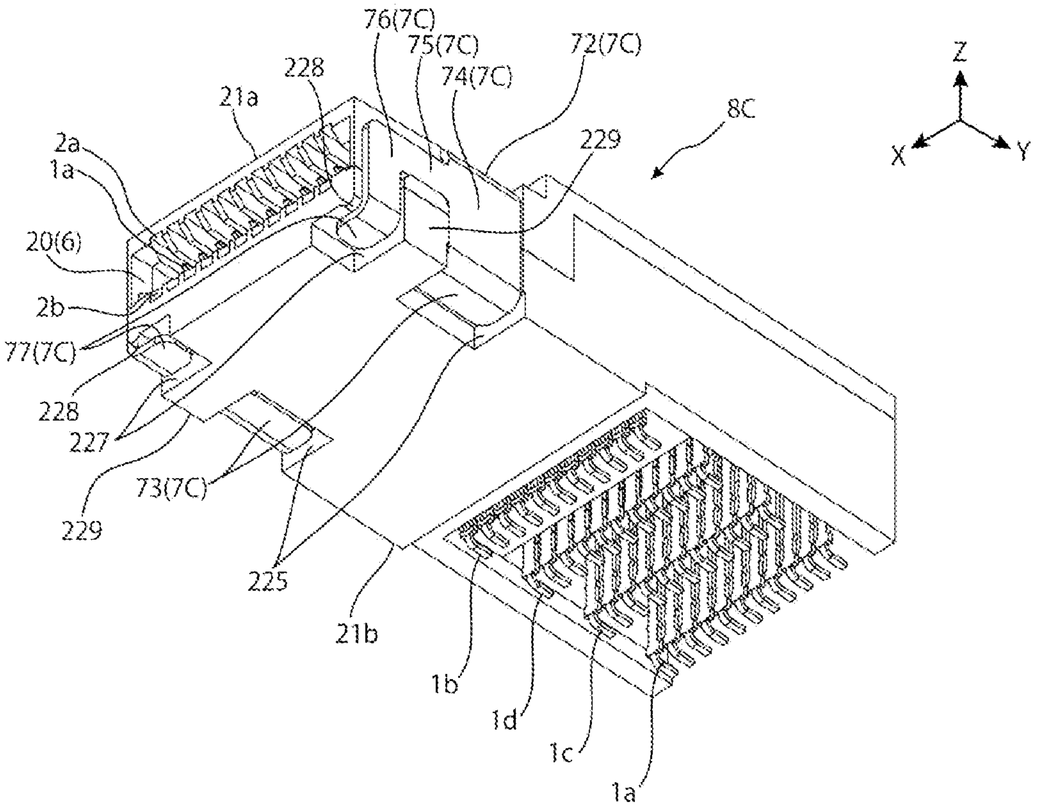
FIG. 13 is a perspective view of FIG. 12 as viewed from another direction.
Figure 14:
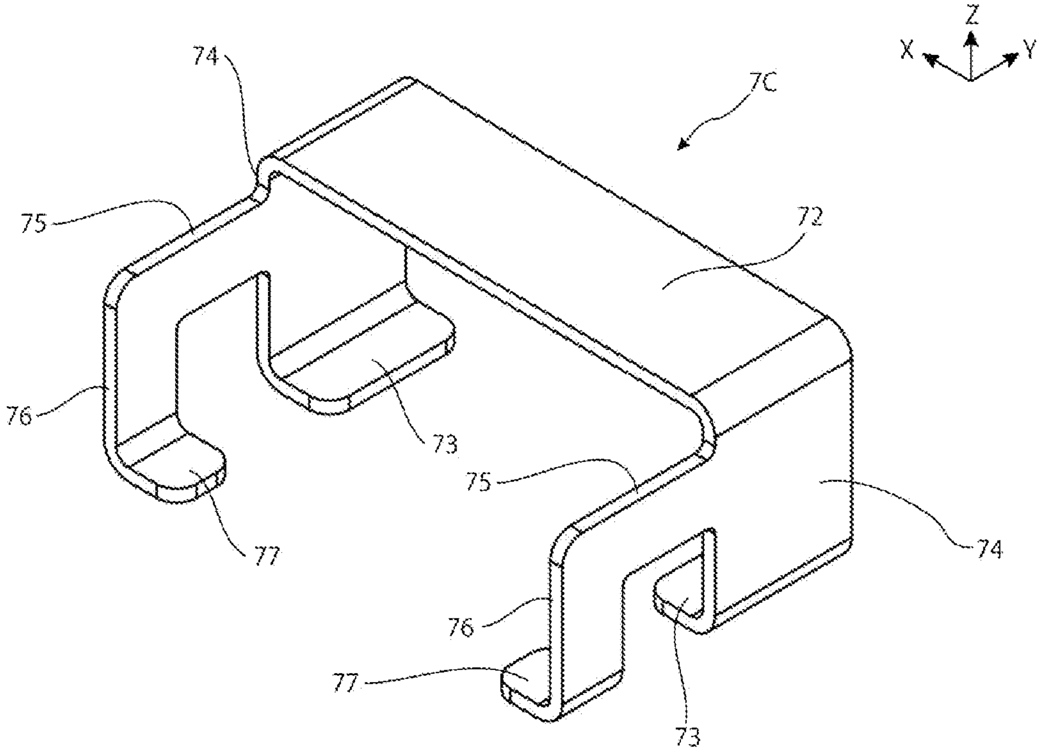
FIG. 14 is a perspective view of a metal member of FIG. 12.
Figure 15A:
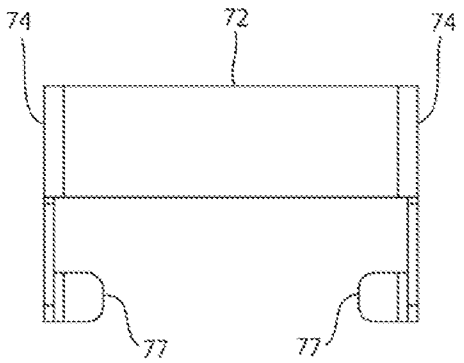
FIG. 15A is a diagram of FIG. 14 as viewed from the +Z side.
Figure 15B:
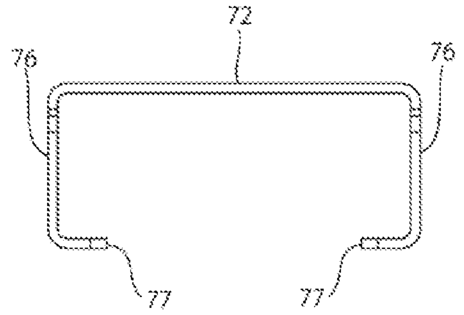
FIG. 15B is a diagram of FIG. 14 as viewed from the −Y side.
Figure 15C:
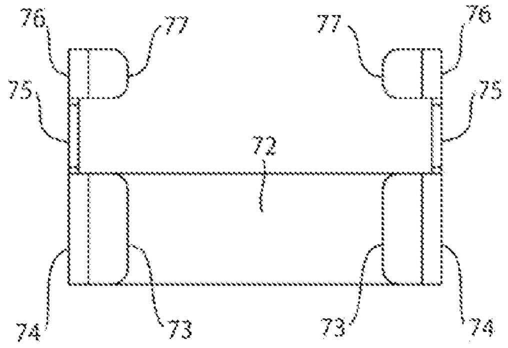
FIG. 15C is a diagram of FIG. 14 as viewed from the −Z side.
Figure 15D:
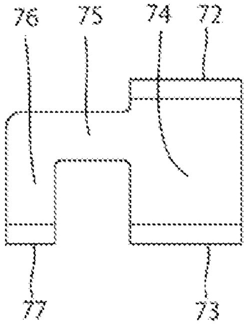
FIG. 15D is a diagram of FIG. 14 as viewed from the −X side.

Further, as shown in FIG. 13 and FIG. 14, the crossing portion of the side surface and the lower surface on the front side of the recess 225 of the lower housing 21*b* is recessed as the second recess 227. A second convex portion 228 projecting downward is provided at a portion of the recess 225 going around from the side surface of the lower housing 21*b* to the lower surface. The second return portion 77 of the metal member 7 goes around to the inside of the second convex portion 228 and supports the second convex portion 228 from the lower side. Further, the portion between the recess 225 and the second recess 227 on the side surface of the upper housing 21*a* and the side surface of the lower housing 21*b* projects outward as the third convex portion 229. The third convex portion 229 is fitted into the portion surrounded by the vertical plate portion 74, the projecting portion 75, and the second vertical plate portion 76. According to the present embodiment, strength of the portions of the housing of the high-speed transmission connector 8C above and below the slot 6 can be further improved.

Although the embodiments of the present disclosure have been described above, the following modifications may be added to the embodiments.

(1) The outer housing 21 in the above second embodiment may be divided into the upper housing 21*a* and the lower housing 21*b* of the third embodiment or the upper housing 21*a* and the lower housing 21*b* of the fourth embodiment.

(2) The lower surfaces of the return portions 73 or the second return portions 77 of the metal members 7 of the above third embodiment and the fourth embodiment may be the joining portions 70 as in the second embodiment.

What is claimed is:

1. A high-speed transmission connector comprising:
- a housing comprising a slot to be fitted with a header of an external communication partner, and an upper plate portion and a lower plate portion facing each other vertically across the slot;
- a row of front side contacts supported on the housing in such a manner that contact portions are exposed on a front side in the slot;
- a row of rear side contacts supported on the housing in such a manner that contact portions are exposed on a rear side in the slot; and
- a metal member located between the contact portions of the row of front side contacts and the contact portions of the row of rear side contacts to fasten the upper plate portion and the lower plate portion from outside, thereby supporting the upper plate portion and the lower plate portion, wherein the housing comprises an inner housing and an outer housing.

2. The high-speed transmission connector according to claim 1, wherein:
- the outer housing comprises an upper housing, a lower housing,
- the upper housing, the lower housing and the inner housing are combined in such a manner that the upper housing and the lower housing are aligned up and down across a gap, and the inner housing is housed in the upper housing and the lower housing, and
- a portion surrounding the slot in the upper housing and the lower housing is formed with a recess into which the metal member is fitted.

3. The high-speed transmission connector according to claim 1, wherein the metal member is formed by bending one metal plate.

4. The high-speed transmission connector according to claim 3, wherein the metal member comprises:
- a horizontal plate portion extending in one direction;
- vertical plate portions bending and extending downward from both ends of the horizontal plate portion; and
- first return portions bending and extending inward from lower ends of the vertical plate portions.

5. The high-speed transmission connector according to claim 4, wherein a joining portion to be soldered to an external circuit board is constituted by a lower surface of the first return portion.

6. The high-speed transmission connector according to claim 4, wherein the housing is provided with a recess formed by recessing a portion of the housing from an upper surface to a lower surface via a side surface, and a convex portion projecting downward is provided at a portion of the recess going around from the side surface side to the lower surface side, and the return portion supports the convex portion from a lower side.

7. The high-speed transmission connector according to claim 4, wherein the metal member further comprises:

projecting portions projecting forward from front end sides of the vertical plate portions;

second vertical plate portions extending downward from front ends of the projecting portions; and second return portions bending and extending inward from lower ends of the second vertical plate portions.

8. The high-speed transmission connector according to claim 7, wherein:

the housing is provided with a recess formed by recessing a portion of the housing from an upper surface to a lower surface via a side surface, and a second recess formed by recessing a crossing portion of the side surface and the lower surface on a front side of the recess, a first convex portion projecting downward is provided at a portion of the recess going around from the side surface side to the lower surface side, a second convex portion projecting downward is provided at a portion of the second recess going around from the side surface side to the lower surface side, the first return portion supports the first convex portion from a lower side, and the second return portion supports the second convex portion from a lower side.

9. The high-speed transmission connector according to claim 8, wherein a portion between the first recess and the second recess on a side surface of the housing projects outward as a third convex portion, and the third convex portion is fitted in a portion surrounded by the vertical plate portion, the projecting portion, and the second vertical plate portion.

* * * * *